J. F. HALLER.
FRUIT WASHING MACHINE.
APPLICATION FILED SEPT. 28, 1908.
952,734.
Patented Mar. 22, 1910.
2 SHEETS—SHEET 2.
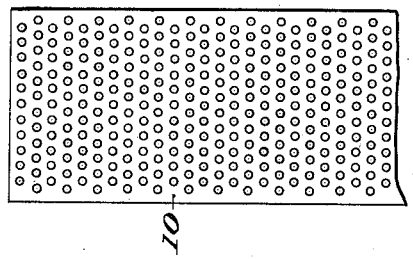
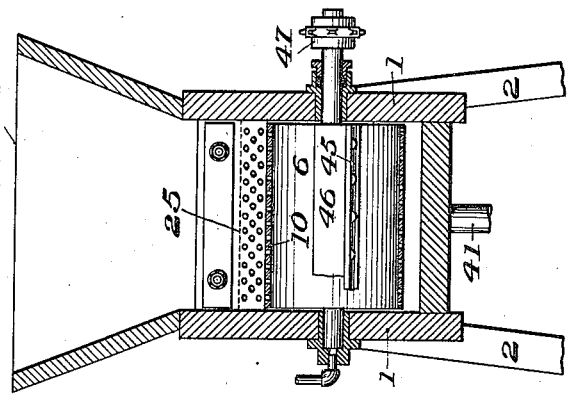
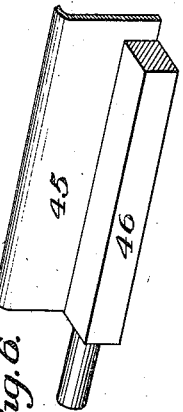
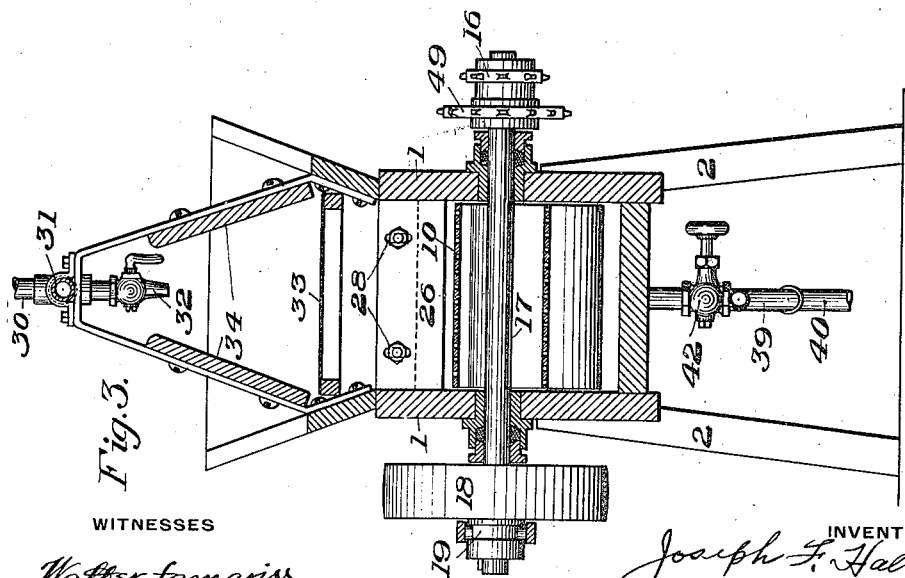

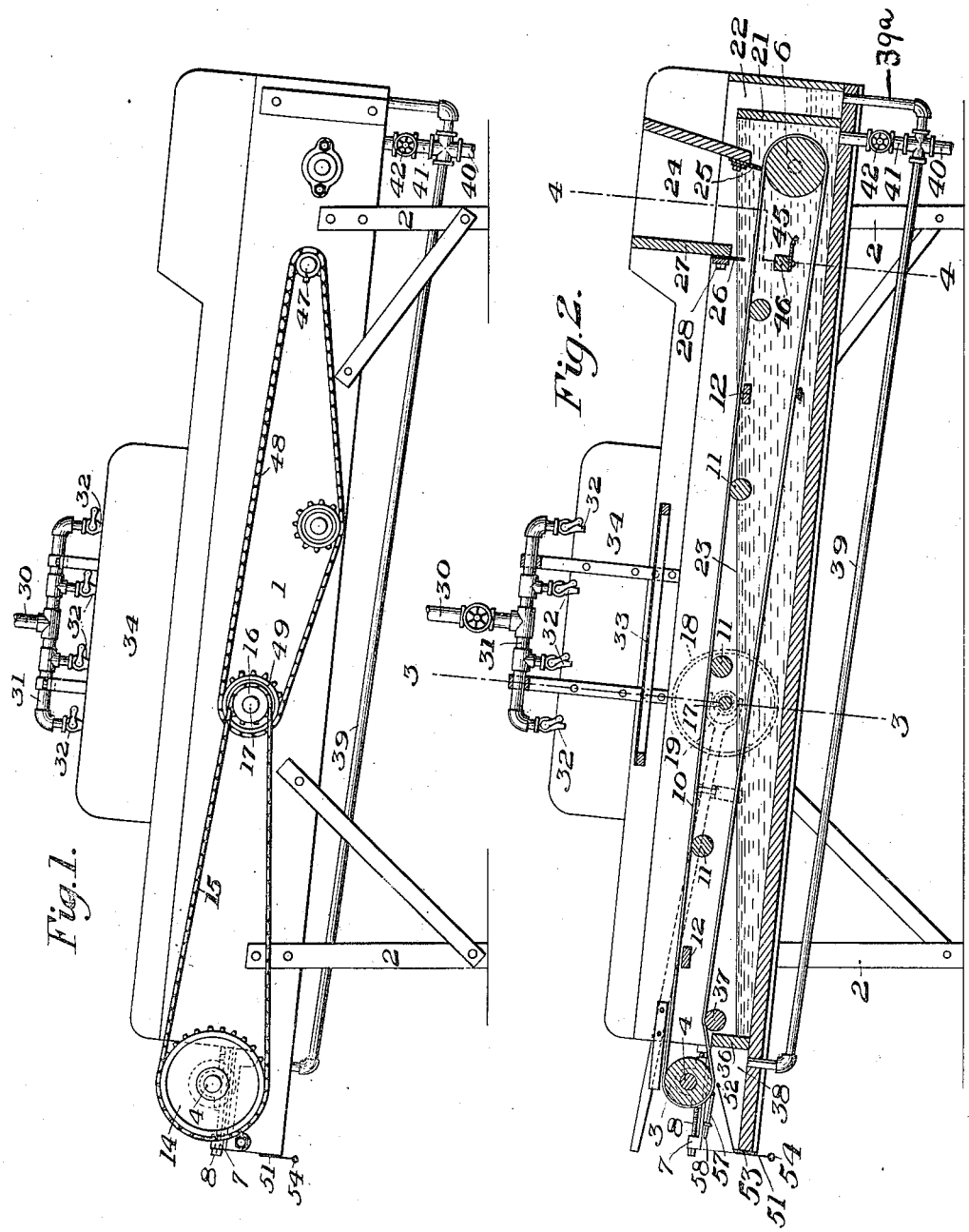

UNITED STATES PATENT OFFICE.

JOSEPH F. HALLER, OF SHERIDANVILLE, PENNSYLVANIA.

FRUIT-WASHING MACHINE.

952,734. Specification of Letters Patent. Patented Mar. 22, 1910.

Application filed September 28, 1908. Serial No. 455,193.

*To all whom it may concern:*

Be it known that I, JOSEPH F. HALLER, a resident of Sheridanville, in the county of Allegheny and State of Pennsylvania, have invented a new and useful Improvement in Fruit-Washing Machines, of which the following is a specification.

This invention relates to washing machines and more particularly to a machine for washing strawberries, raspberries, blackberries and other comparatively soft fruits and vegetables.

The object of the invention is to provide apparatus for washing such soft fruits and the like whereby the same will be thoroughly cleansed without crushing, bruising or otherwise injuring the same.

The invention comprises the construction and arrangement of parts hereinafter described and claimed.

In the accompanying drawings Figure 1 is a side view of the machine; Fig. 2 is a vertical longitudinal sectional view of the machine; Figs. 3 and 4 are vertical transverse sections taken respectively on the lines 3—3 and 4—4, Fig. 2; Fig. 5 is a detail view of a portion of the belt or conveyer; Fig. 6 is a perspective detail of the paddle for forcing the water up through the conveyer; and Fig. 7 is a perspective view of the scraper.

The machine comprises a long trough 1 supported on legs 2 and preferably inclined upwardly from the receiving to the delivery end. Mounted in the lower or receiving end of the trough is a roller 6 while in the upper end is a roller 3 secured on a shaft 4 which is mounted in bearings 7 which are adjustable by suitable means, such as screws 8, in order to vary the position of said roller. Passing over the rollers 3 and 6 is a suitable flexible conveyer, which preferably is a perforated rubber belt 10 and serves as a support and conveyer for the fruit being washed. Intermediate portions of the upper reach of said conveyer are supported on idle rollers 11 journaled in the sides of the trough.

12 are cross braces connecting the sides of the trough. The adjustable bearings 7 serve as a means for tightening the conveyer.

The conveyer is driven by sprocket wheel 14 on the shaft or roller 3 and connected by sprocket chain 15 to a similar sprocket 16 on transverse shaft 17 mounted in suitable water-tight bearings in the sides of the trough and having its opposite end provided with loose belt pulley 18 driven from any suitable source and adapted to be locked to the shaft by a suitable clutch 19. Any other driving means, however, may be used.

The conveyer 10 has its delivery end at a higher level than the receiving end.

At the lower end of the trough is a suitable partition or bulkhead 21 providing a space 22 between the same and the end of the trough and serving as the overflow for the water. The water level is maintained at the height of this partition or bulkhead and is indicated by the line 23. The receiving end of the conveyer is located somewhat below the water level while the delivery end is above the same.

Located above the conveyer at the lower end of the trough is a hopper 24 for receiving the fruit to be washed. The walls of this hopper extend down into fairly close proximity to the conveyer 10. The rear wall is provided with a flexible shutter 25, preferably of rubber and perforated as shown to allow the circulation of the water. The front wall is also provided with an adjustable flexible shutter 26 which may or may not be perforated and which is connected to the front wall 27 of the hopper so as to allow for vertical adjustment, such as by means of the bolt and slot connection 28. This permits said shutter to be raised more or less from the conveyer in order to allow the passage of fruit of various sizes. This front shutter serves to spread the fruit over the conveyer and permits the fruit to escape from the hopper in a single layer only. It is also preferably formed of rubber so as not to injure the fruit.

The water is supplied through pipe 30 connected to a longitudinal pipe 31 carrying a plurality of downwardly projecting spray nozzles 32. Between the nozzles and the conveyer is located suitable means for breaking the water into a fine spray or mist so as to prevent striking the fruit too forcibly and bruising the same. This means is shown as a wire screen sieve 33 arranged horizontally between the sides of the trough. Splash boards 34 are also preferably provided. The spraying nozzles and sieve 33 are located above the conveyer just after the latter emerges from the water in the trough. The water supplied through the sprayers maintains the water lever, the surplus flowing over the wall or bulkhead 21.

At the upper end of the trough is a transverse wall or bulkhead 36 projecting somewhat above the water level. A guide roller 37 for the conveyer is provided at this point so as to lift the lower reach of the conveyer slightly and allow the use of a comparatively high end wall or bulkhead so that the water will not so readily splash over the same. Any water which does splash over the same is received in the compartment 38 and is carried away by the drain pipe 39 leading to the outlet pipe 40. A pipe 39$^a$ leads from the overflow space 22 at the lower end of the trough to the outlet pipe 40. A cleaning pipe 41 connects the lower end of the trough with the outlet pipe and is provided with a valve 42.

In order to prevent bruising the fruit and also to assist it in escaping from the lower end of the hopper and spread the same uniformly over the conveyer I provide suitable means for causing the water to pass upwardly through the perforated conveyer underneath the hopper in a non-continuous or pulsating manner. I have shown for this purpose a suitable paddle 45 on a transverse shaft 46 mounted in suitable water-tight bearings in the sides of the trough and provided on its outer end with sprocket wheel 47 which is connected by sprocket chain 48 to a sprocket wheel 49 on the driving shaft 17. The rotating paddle forces the water upwardly through the perforated conveyer and then allows the same to recede, thereby producing pulsations which cause a vibrating movement of the conveyer and also act to lift the fruit off the conveyer. Thus the fruit is washed in a manner to prevent crushing or bruising the same, while the agitation serves to loosen the fruit in the lower part of the hopper and distributes the fruit which passes the shutter 26 in a uniform layer on the conveyer.

The conveyer carries the fruit up out of the water toward the delivery end, and by the time it reaches the delivery end the bulk of the water has drained off through the perforated conveyer. At the delivery end the fruit is deposited upon an apron 51 preferably formed of cloth or similar porous and absorbent material. This cloth at its upper end is supported on a rod 52 and it hangs down over a cross piece 53 on the end of the trough and its lower edge is provided with a suitable weight or weights 54 to keep said apron taut. From the apron the fruit passes into a suitable receptacle. The cross member 53 is provided with a comparatively sharp edge over which the apron passes and this serves to stop the downward flow of any water which is deposited on or absorbed by the apron and causes the same to enter the compartment 38. In this manner the fruit is delivered into the receptacle comparatively free from water.

A scraper 57 is located below the conveyer at the delivery end to scrape off any fruit which may adhere to the belt and cause the same to drop onto the apron 51. This scraper is shown formed of wire in the form of a square bail with the ends of the legs secured to the sides of the trough at 58. The resiliency of the wire causes it to exert a uniform pressure against the belt.

In the operation of the machine the water is supplied through the spray nozzles in the desired quantity. The water level is maintained uniform by the overflow wall or bulkhead 21. The fruit is deposited in the hopper 24 and is gradually carried by the conveyer along the trough and finally deposited upon apron 51 from which it passes into the receptacle. The paddle lifts the water periodically in pulsations through the perforated conveyer, and then allows it to recede, thereby loosening the fruit in the hopper and distributing it over the conveyer in an even layer. The fruit at this point is entirely submerged and is subjected to the pulsating action of the water which is so applied as to lift the fruit off the conveyer instead of forcing the same down onto the same. Hence the fruit is cleansed in a manner not to crush or bruise the same. The conveyer carries the fruit up out of the water and then it receives the broken up spray or mist through the sieve 33 so that the fruit is here washed clean and by a very soft spray of water. By the time the fruit reaches the delivery end of the conveyer most of the water has drained off through the perforated conveyer. The fruit is deposited on the flexible apron so that it is not bruised in falling and the remaining water on the fruit is caught by the cloth apron and is arrested by the knife edge on bar 53 so that the fruit passes into the receiving receptacle practically free from water. The water from apron 51 and that which splashes over the bulkhead 36 is carried off through drain-pipe 39. The overflow including all floating dirt is carried off by drain pipe 39$^a$. The sand and heavy dirt settles in the lower end of the trough from which it can be drawn periodically by opening valve 42.

The conveyer preferably is a perforated rubber belt as shown, but if desired it may be of any flexible construction having openings to permit the water to drain through the same and also be forced up through the same. The machine can be used for washing all kinds of soft fruits and may be used for washing and scalding tomatoes. In the latter case the water will be maintained at scalding temperature and the conveyer will be of a character not affected by the hot water, such as a jointed metallic belt.

The machine is of simple construction, is easy to operate, has a very large capacity and requires a minimum amount of attention. It thoroughly and effectively washes all kinds of soft fruits or other soft material and without bruising or otherwise injuring the same. The fruit emerges from the machine in a perfectly bright and solid condition, all dirt and mashed and soft decayed parts being thoroughly removed.

What I claim is:

1. A fruit washer comprising a perforated support, a hopper for the fruit above the support and spaced therefrom, and means for forcing the water upwardly through said support and into said hopper and then allowing it to recede.

2. A fruit washer comprising a perforated flexible support, a hopper for the fruit located above said support and projecting into proximity thereto, and means for forcing the water upwardly and through said support and into said hopper and then allowing it to recede.

3. A fruit washer comprising a perforated traveling support, a hopper for the fruit located above said support and spaced therefrom, and means for forcing water upwardly through said support and into said hopper and then allowing it to recede.

4. A fruit washer comprising a perforated traveling flexible support, a hopper above said support and projecting into proximity thereto, and means for forcing water upwardly through said support and into said hopper and then allowing it to recede.

5. A fruit washer comprising a trough for containing water, a perforated support below the water level, a hopper for the same located above said support, and means in said trough for forcing the water upwardly through the support and into the hopper and then allowing it to recede.

6. A fruit washer comprising a trough for containing water, an inclined traveling perforated support in said trough with one end below the water level, a hopper above the lower end of said support, and means below said support for forcing the water upwardly through said support and into said hopper and then allowing it to recede.

7. A fruit washer, comprising a trough adapted to contain water, a perforated traveling conveyer in said trough and located partly below the level of the water, a hopper located above the submerged portion of the conveyer and projecting below the water level, and means for forcing water upwardly through said conveyer and into said hopper and then allowing the same to recede.

8. A fruit washer, comprising a trough adapted to contain water, a traveling perforated conveyer having one end located below the water level, a hopper above the lower end of said conveyer, a flexible adjustable shutter on the forward side of said hopper, and means for forcing the water upwardly through said conveyer and into said hopper and then permitting the same to recede.

9. A fruit washer comprising a trough adapted to contain water, a traveling perforated conveyer having one end located below the water level, a hopper above the submerged portion of said conveyer, and means in said trough below said hopper for forcing the water upwardly through the conveyer and into said hopper and then permitting the same to recede.

10. A fruit washer, comprising a trough, a water supply and overflow therefor, a traveling carrier having one end located below the water level and gradually rising above the same, a hopper above the lower end of said conveyer, and means for forcing the water upwardly through said carrier and into the hopper and then permitting the same to recede.

11. A fruit washer, comprising a trough, a water supply and overflow therein, a traveling perforated carrier in said trough with one end below the water level and its opposite end above the same, a hopper above the lower end of the carrier and projecting below the water level, and means below the carrier for forcing the water upwardly through said carrier and then permitting the same to recede.

12. A washer for soft fruit comprising a traveling perforated carrier upon which the fruit is supported, a sieve located above the carrier, a spraying nozzle located above the sieve in a position to project an unconfined stream there-against and having a much lesser capacity to pass water than said sieve, and a water supply to said nozzle.

13. A washer for soft fruit comprising a trough, an over-flow therefor arranged to maintain a constant water level therein, a traveling perforated carrier having one end below the water level and the other above the same, a sieve above that portion of the carrier which is above the water level, a spraying nozzle located above the sieve and in position to project an unconfined stream against said sieve and having a much lesser capacity to pass water than said sieve, and a water supply pipe connected to said nozzle.

14. A fruit washer, comprising a trough, an overflow therefor arranged to maintain a constant water level, a traveling perforated carrier having one end arranged below the water level and the other end above the same, a hopper above the lower end of said carrier, means for forcing water upwardly through the carrier and then permitting the same to recede, a spray located over the portion of the carrier which is above the water level, and a sieve between said spray and carrier.

15. A fruit washer, comprising a trough arranged to contain water, a traveling perforated carrier in said trough, a hopper above said carrier, and a single bladed paddle wheel located underneath the carrier in position to force the water upwardly through the carrier and into the hopper.

16. A fruit washer comprising a trough adapted to contain water, a traveling conveyer therein, means for washing the fruit on the conveyer, a fabric apron arranged to receive the fruit at the delivery end of the conveyer, said apron sloping downwardly and passing over a member provided with a sharp edge.

17. A fruit washer comprising a trough, a traveling conveyer therein, means for washing the fruit on said carrier, a fabric apron at the delivery end of the conveyer, and a scraper yielding bearing against said conveyer at the delivery end.

In testimony whereof, I have hereunto set my hand.

JOSEPH F. HALLER.

Witnesses:
 FRED. C. GROTE,
 F. W. WINTER.